UNITED STATES PATENT OFFICE.

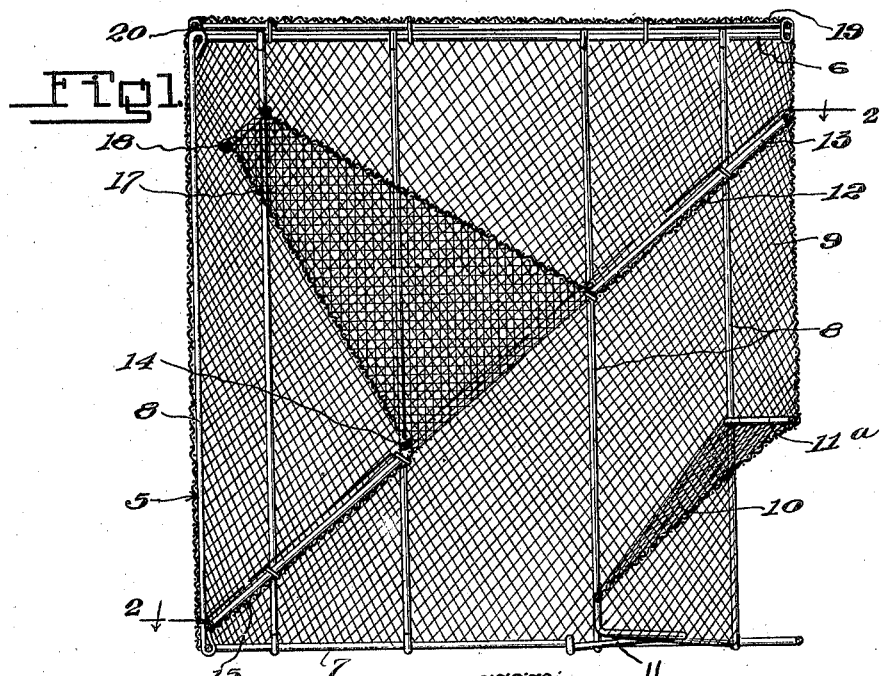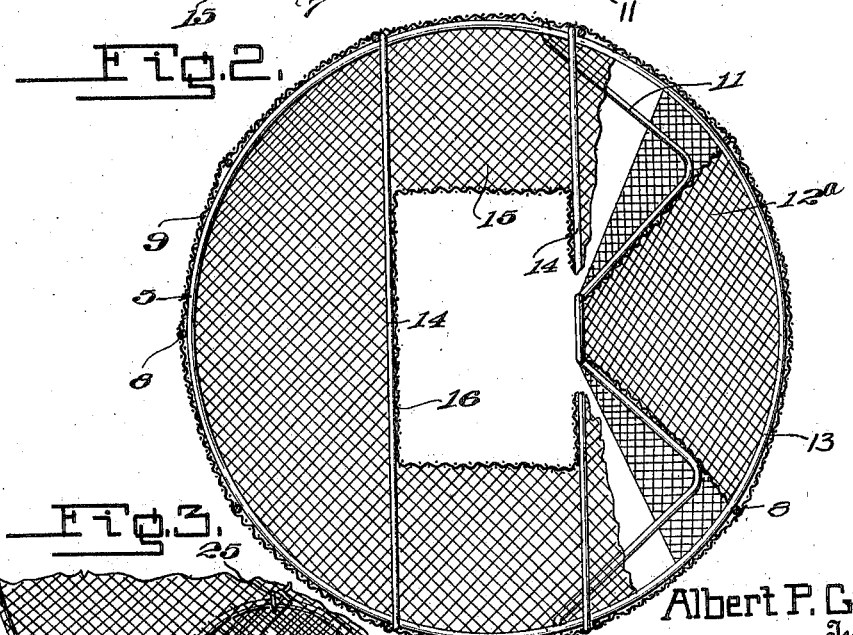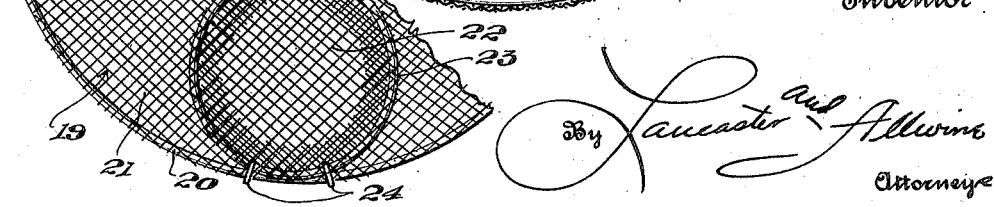

ALBERT P. GREIM, OF TOMS RIVER, NEW JERSEY.

TRAP.

1,393,438.　　　　　Specification of Letters Patent.　　Patented Oct. 11, 1921.

Application filed November 1, 1919. Serial No. 335,161.

*To all whom it may concern:*

Be it known that I, ALBERT P. GREIM, a citizen of the United States, residing at Toms River, in the county of Ocean and State of New Jersey, have invented certain new and useful Improvements in Traps, of which the following is a specification.

This invention relates to traps and more particularly to a trap designed for catching sparrows.

It is well known that English sparrows are a nuisance in many localities, that they drive song birds and more desirable birds away, often destroying the eggs of the more desirable birds and fighting the said birds, causing them to seek other localities. Furthermore, it is well known that English sparrows are destructive, destroying gardens, flowers or the like, when first emerging from the ground and they also render places unsightly with the building of their nests, and otherwise, particularly in case of vine covered walls and objects of art in carved cornices, etc., together with their excessive quarrelsome noise and chatter rendering them an undesirable annoyance; and an object of this invention is to provide a trap for catching the sparrows and consequently exterminating them.

Another object of this invention is to provide a sparrow trap embodying a pair of leads or funnels, positioned one above the other having communication respectively with the entrance compartment and the confining compartment and furthermore a trap which is circular in shape, rendering it easily adaptable for shipment by parcel post.

In use of the trap the first sparrow caught acts as a decoy to attract other sparrows thereto, and it is an object of this invention to position the confining compartment of the trap directly over the entrance compartment so that the decoyed sparrow will be positioned to attract other sparrows to the entrance leads or funnel of the trap structure.

Other objects of the invention will appear in the following detailed description taken in connection with the accompanying drawing forming a part of this specification and in which drawing:

Figure 1 is a vertical section through the improved trap.

Fig. 2 is a section through the trap, taken on the line 2—2 of Fig. 1, and showing a part thereof cut away.

Fig. 3 is a fragmentary top plan of the trap illustrating the door by means of which the sparrows may be removed from the confining compartment of the trap.

Referring more particularly to the drawings, the improved sparrow trap comprises the skeleton frame 5 which is made up of relatively heavy wire comprising an upper annulus 6 and a lower annulus 7 to which the uprights 8 are attached in any suitable manner such as by bending their ends over the annuli 6 and 7 and welding them. The uprights 8 are spaced at desired circumferential distances about the annuli 6 and 7, and they have attached thereto a casing 9 of sheet wire, or mesh which incloses the skeleton frame 5. An entrance lead 10 is provided to permit the entrance of the sparrows into the interior of the trap structure and this lead is formed by the lower end or bottom of the trap entering into the trap from the ground or surface upon which the trap is supported and it is formed of suitable bracing wires 11 and 11ª which are attached to the lower annulus 7 and uprights 8 and are covered with screen wire or netting 12ª, inclining downwardly and inwardly as clearly shown in Figs. 1 and 2 of the drawings, to provide a lead the outlet end of which opens into the trap and is constricted with respect to the entrance thereof. The interior of the trap is divided into the entrance or feeding compartment and a confining compartment by the diagonally extending partition 12. This partition 12 is formed of an oval shaped frame 13 made of wire which is braced by transversely extending braces 14. The braces 14 as well as the frame 13 are connected in any suitable manner to the uprights 8 of the skeleton frame 5 in such manner as to rigidly hold it in place. The frame 13 has screen netting 15 attached thereto, which separates the upper confining compartment from the lower entrance or feeding compartment and this screen 15 is provided with a rectangular opening 16 substantially in the center of the partition 12. A substantially pyramidal lead 17 is attached to the partition 12 at the large end of the lead and about the opening 16 the said lead extending upwardly into the confining compartment and having its outlet opening constricted and reinforced by an annulus or ring 18.

The top of the trap is closed by a suitable cover 19 formed from a reinforcing ring 20 made of wire, similar to the wire of which the skeleton frame 5 is made and which has a circular disk 21 of screen wire or foraminous netting attached thereto. This netting is provided with an opening therein preferably adjacent the rim 20 as clearly shown in Fig. 3 of the drawings, which opening is normally closed by a door or closure structure 22 comprising reinforcing or bracing rib 23 which is preferably connected as shown at 24 to the rib 20 and a disk of netting or wire is attached thereto to close the opening formed in the wire disk 21. Any suitable means may be employed for holding this door 22 closed, such as the length of pliable wire as shown at 25 which, when threaded about the ring 22 and through certain of the openings in the disk 21 may have its ends twisted together to securely hold the door closed as shown in Fig. 3 of the drawings.

In use, any suitable type of food, such as cracked grain, bread crumbs or the like which would attract sparrows is placed on the ground within the entrance compartment of the trap and this will attract the sparrows, causing them to walk around the trap until they find the entrance opening or entrance lead, passing therethrough into the interior of the trap, they will after they have eaten or in case they become frightened endeavor to get out of the trap and while some of the older wise birds may find their way out of the opening 10 the majority of them will pass upwardly through the lead 17, and emerging from this lead will enter the confining compartment, which as clearly shown in Fig. 1 of the drawings is positioned directly across the entrance compartment. The first bird caught in the confining compartment will serve as a decoy for attracting other birds, and consequently the more birds that are caught in the trap within certain limits the greater will be the attraction thereof for other sparrows. After the birds have been caught in the confining compartment of the trap, they may be killed in any desired manner and removed through the opening in the top 19.

Changes in details may be made without departing from the spirit of this invention, but;

I claim:

1. In a trap, the combination of a foraminous circular body, a partition extending diagonally through the body and dividing it into a lower entrance compartment, and an upper confining compartment, and a non-return lead opening through said partition and extending into the confining compartment.

2. In a trap, the combination of a foraminous circular body, a partition extending diagonally through the body and dividing it into a lower entrance compartment and an upper confining compartment, a non-return lead opening through said partition and extending into the confining compartment, said partition formed of foraminous material, said non-return lead formed of foraminous material, and a reinforcing ring about the outlet end of the non-return lead.

3. In a trap, the combination of a foraminous circular body, a partition extending diagonally through the body and dividing it into a lower entrance compartment and an upper confining compartment, a non-return lead opening through said partition and extending into the confining compartment, said partition formed of foraminous material, said non-return lead formed of foraminous material, a reinforcing ring about the outlet end of the non-return lead, and a non-return lead communicating with said entrance compartment at the lower end of one side of the body.

4. In a trap, the combination of a foraminous circular body, a partition extending diagonally through the body and dividing it into a lower entrance compartment and an upper confining compartment, a non-return lead opening through said partition and extending into the confining compartment, said partition formed of foraminous material, said non-return lead formed of foraminous material, a reinforcing ring about the outlet end of the non-return lead, a non-return lead communicating with said entrance compartment at the lower end of one side of the body, a cover mounted upon the top of said body and provided with an opening, a circular closure for said opening hingedly connected to the cover.

ALBERT P. GREIM.